United States Patent [19]

Ray et al.

[11] Patent Number: 5,628,470
[45] Date of Patent: May 13, 1997

[54] SEAT BELT WEBBING RETRACTOR

[75] Inventors: Gary M. Ray, Royal Oak; Robert F. Rogers, Orion Township, both of Mich.

[73] Assignee: TRW Vehicle Safety Systems Inc., Lyndhurst, Ohio

[21] Appl. No.: 412,725

[22] Filed: Mar. 29, 1995

[51] Int. Cl.⁶ .......................... B60R 22/34; B65H 75/48
[52] U.S. Cl. ................................................... 242/375.3
[58] Field of Search .................. 242/375.3; 280/806, 280/807; 297/475–478

[56] References Cited

U.S. PATENT DOCUMENTS

| | | | |
|---|---|---|---|
| 3,997,126 | 12/1976 | Karlsson | 242/375.3 |
| 4,061,291 | 12/1977 | Cunningham. | |
| 4,084,765 | 4/1978 | Bonnaud | 242/375.3 |
| 4,290,564 | 9/1981 | Karlsson. | |
| 4,301,977 | 11/1981 | Yang | 242/375.3 |
| 5,409,176 | 4/1995 | Kopetzky | 242/375.3 |

FOREIGN PATENT DOCUMENTS

| | | |
|---|---|---|
| 4225073 | 3/1994 | Germany. |
| 4241730 | 6/1994 | Germany. |

*Primary Examiner*—John M. Jillions
*Attorney, Agent, or Firm*—Tarolli, Sundheim, Covell, Tummino & Szabo

[57] ABSTRACT

A seat belt webbing retractor (10) includes a belt webbing spool (50) and a length of belt webbing (16) wound on the belt webbing spool. A spring (82) biases the belt webbing spool (50) for rotation in a belt retraction direction. A pair of rotatable cable spools (90, 100) and a cable (110) transmit the biasing force of the spring (82) to the belt webbing spool (50) to apply a retraction force to the belt webbing (116). Each of the cable spools (90, 100) has a predetermined configuration to provide a desired retraction force curve (230).

11 Claims, 6 Drawing Sheets

SEAT BELT WEBBING RETRACTOR

BACKGROUND OF THE INVENTION

1. Technical Field

The present invention relates to a vehicle seat belt webbing retractor in which seat belt webbing is wound on a spool which is biased for rotation in a belt retraction direction. The present invention particularly relates to a vehicle seat belt webbing retractor including a mechanism for controlling the retraction force on the belt webbing.

2. Description of the Prior Art

A typical vehicle seat belt system includes a length of belt webbing wound on a belt webbing spool of a seat belt webbing retractor. The belt webbing is extensible about a vehicle occupant to restrain the occupant. The belt webbing spool rotates in a belt withdrawal direction as the occupant withdraws belt webbing from the retractor. A rewind spring is connected with the belt webbing spool and biases the belt webbing spool for rotation in an opposite belt retraction direction.

The rewind spring exerts a retraction force on the belt webbing spool, and thus on the belt webbing. This retraction force is transmitted to the torso of the vehicle occupant through the shoulder belt portion of the belt webbing. The retraction force commonly increases as the rewind spring is wound tighter when belt webbing is withdrawn from the spool, and the belt webbing may exert an uncomfortably large amount of force on the torso of the vehicle occupant. In order to provide a constant retraction force on the belt webbing, it is known to provide a system of conical spools disposed in a force-transmitting relationship intermediate the rewind spring and the belt webbing spool.

SUMMARY OF THE INVENTION

The present invention is a vehicle occupant safety apparatus comprising a belt webbing spool supported for rotation about a belt webbing spool axis in a belt retraction direction and an opposite belt withdrawal direction. A length of belt webbing is wound on the belt webbing spool. The belt webbing is extensible about a vehicle occupant to restrain the occupant. A shaft spool is fixed for rotation with the belt webbing spool in the belt retraction direction and in the belt withdrawal direction. The shaft spool has an outer peripheral surface which has a non-conical configuration. A spring spool is supported for rotation about a spring spool axis in first and second opposite directions. The spring spool axis is spaced apart from the belt webbing spool axis. The spring spool has an outer peripheral surface which has a non-conical configuration. A rewind spring is connected with the spring spool for biasing the spring spool for rotation in the first direction to apply retraction force to the spring spool. An elongate flexible member extends between the outer peripheral surface of the spring spool and the outer peripheral surface of the shaft spool for transmitting retraction force from the spring spool to the shaft spool to bias the belt webbing spool for rotation in the belt retraction direction.

BRIEF DESCRIPTION OF THE DRAWINGS

Further features of the present invention will become apparent to one skilled in the art to which the present invention relates from reading the following specification with reference to the accompanying drawings, in which.

DESCRIPTION OF A PREFERRED EMBODIMENT

Figure 1:
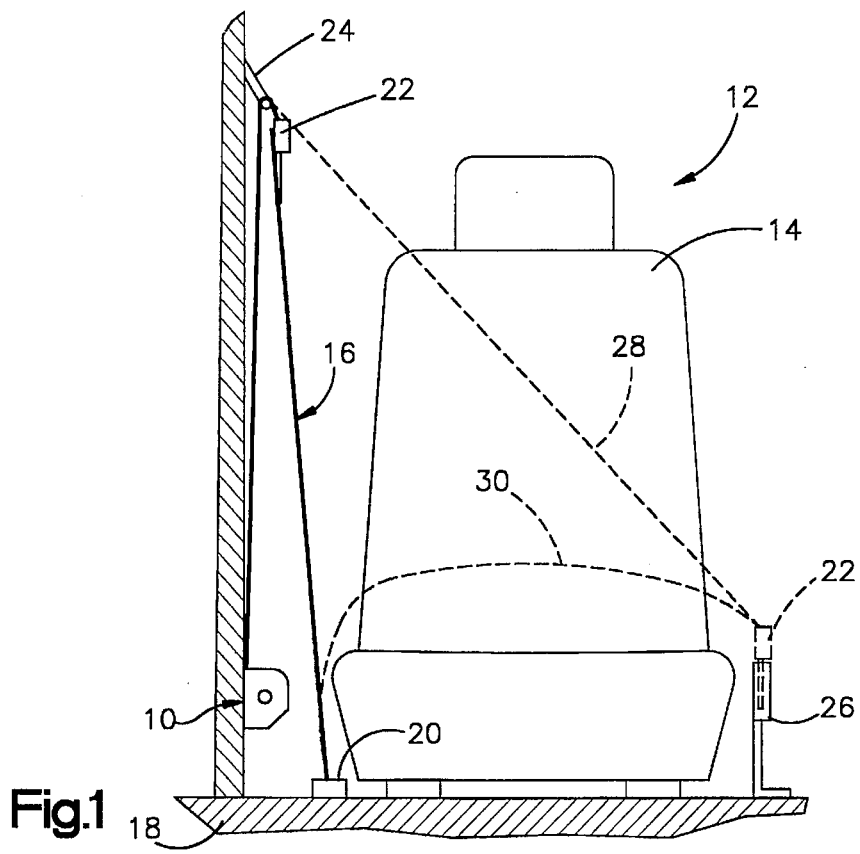
FIG. 1 is a schematic illustration of a vehicle seat belt system including a seat belt retractor constructed in accordance with the present invention.

The present invention relates to a vehicle seat belt webbing retractor and particularly to a retractor including a mechanism for controlling the retraction force on the belt webbing. The present invention is applicable to various retractor constructions. As representative of the present invention, FIG. 1 illustrates a seat belt webbing retractor 10. The retractor 10 is incorporated in a three-point continuous loop seat belt system 12 for use in restraining an occupant of a vehicle.

During operation of the vehicle, the occupant of the vehicle sits on a seat 14 which is illustrated as a front passenger seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

Figure 2:
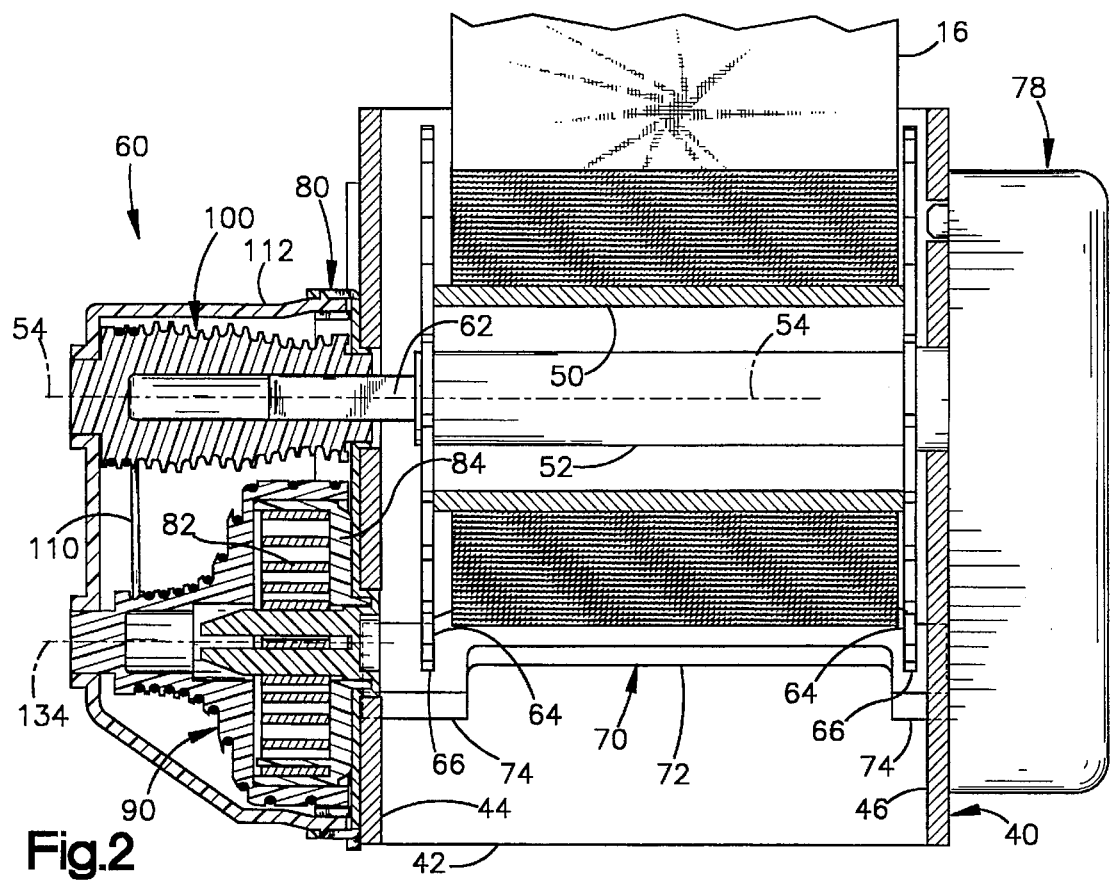
FIG. 2 is a longitudinal view partially in section of the retractor of FIG. 1.
Figure 3:
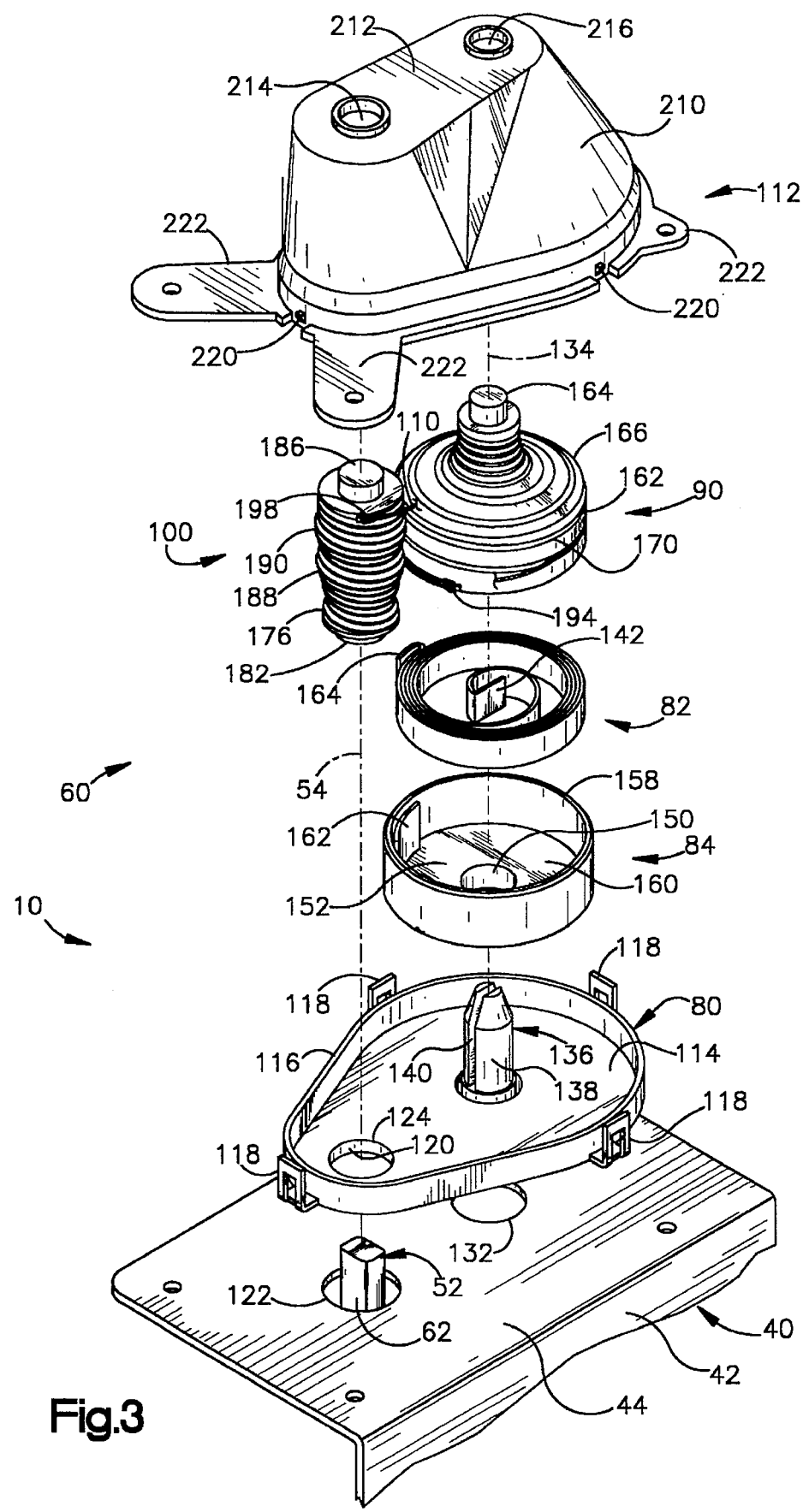
FIG. 3 is an exploded perspective view of a rewind spring assembly which forms a portion of the retractor of FIG. 1.

The retractor 10 (FIGS. 2–4) includes a frame 40 which is fixed to the vehicle body 18 in a manner not shown. The frame 40 is a single piece of sheet metal stamped and formed to a U-shaped configuration as best seen in FIG. 2. The frame 40 includes a back wall 42 and spaced parallel side walls 44 and 46 which extend generally perpendicular to the back wall.

The retractor 10 also includes a belt webbing spool 50 (FIG. 2). The seat belt webbing 16 is wound on the belt webbing spool 50. A shaft 52 extends through the belt webbing spool 50 and is fixed for rotation with the belt webbing spool. The shaft 52 supports the belt webbing spool 50 on the frame 40 for rotation about a belt webbing spool axis 54 relative to the frame in a belt retraction direction 56 (FIG. 9) and in an opposite belt withdrawal direction 58.

A rewind spring assembly 60 (FIG. 2) is disposed on the side of the frame side wall 44 opposite from the belt webbing spool 50. The rewind spring assembly 60 is connected with a first end portion 62 of the shaft 52. The rewind spring assembly 60, described below in detail, biases the belt webbing spool 50 for rotation in the belt retraction direction 56.

Two spaced apart spool locking ratchet wheels 64 are fixed on the shaft 52 for rotation with the shaft and thereby with the belt webbing spool 50. A plurality of ratchet teeth 66 are disposed in a circular array on the outer periphery of each one of the spool locking ratchet wheels 64. A lock bar 70 is supported in openings (not shown) in the side walls 44 and 46 of the frame 40 for pivotal movement relative to the frame. The lock bar 70 has a central portion 72 which extends between two locking portions 74. The locking portions 74 of the lock bar 70 are movable into engagement with the spool locking ratchet wheels 64 to block rotation of the belt webbing spool 50 in the belt withdrawal direction 58.

Inside a cover 78 (FIG. 2), the retractor 10 includes a known mechanism (not shown) for moving the lock bar 70 into engagement with the spool locking ratchet wheels 64 in the event of either or both of (a) sudden vehicle deceleration such as occurs in a vehicle collision and (b) withdrawal of belt webbing 16 from the belt webbing spool 50 at a rate exceeding a predetermined rate. The retractor 10 may also include a cinch mechanism (not shown) for selectively moving the lock bar 70 into engagement with the spool locking ratchet wheels 64.

The rewind spring assembly 60 (FIGS. 2–9) includes a base plate 80, a rewind spring 82, and a spring cup 84. The rewind spring assembly 60 also includes a spring spool 90, a shaft spool 100, a cable 110 interconnecting the spring spool 90 and the shaft spool 100, and a cover 112.

The base plate 80 (FIG. 3) is a molded plastic member fixed in position on the side wall 44 of the frame 40 in a manner described below. A planar portion 114 of the base plate 80 overlies the side wall 44 of the frame 40. An axially projecting rim portion 116 of the base plate 80 encircles the planar portion 114. Four snaps 118 are formed on the rim portion 116, for connecting the base plate 80 with the cover 112 in a manner described below.

A circular boss 120 (FIG. 4) projects axially from the planar portion 114 of the base plate 80 into a circular shaft opening 122 in the side wall 44 of the frame 40. The boss 120 defines a circular opening 124 in the planar portion 114 of the base plate 80. The end portion 62 of the belt webbing shaft 52, which has a rectangular cross sectional configuration, extends through the shaft opening 122 in the side wall 44 of the frame 40 and through the opening 124 in the base plate 80.

A second circular boss 130 (FIG. 4) projects axially from the planar portion 114 of the base plate 80 into a second circular opening 132 in the side wall 44 of the frame 40. The opening 132 is centered on a spring spool axis 134 of the retractor 10. The spring spool axis 134 is spaced apart from and extends parallel to the belt webbing spool axis 54.

The base plate 80 includes a cylindrical arbor 136 centered on the spring spool axis 134 and projecting from the planar portion 114 of the base plate in a direction away from the side wall 44 of the frame 40. The arbor 136 has a cylindrical outer surface 138. A slot 140 is formed in the arbor 136 for receiving an inner end portion 142 of the rewind spring 82.

The spring cup 84 is a cup-shaped plastic member supported for rotation on the base plate 80. The arbor 136 extends axially through a circular central opening 150 in a radially extending end wall 152 of the spring cup 84. The spring cup 84 is rotatable about the spring spool axis 134 in a first direction 154 (FIG. 9) and in a second direction 156 opposite to the first direction.

A cylindrical side wall 158 (FIG. 2) of the spring cup 84 is formed as one piece with the end wall 152. The side wall 158 extends axially from the end wall 152 in a direction away from the frame 40. The side wall 158 and the end wall 152 together define a spring chamber 160 in the spring cup 84. An arcuate tab 162 projects axially from the end wall 152 of the spring cup 84 at a location inside the spring chamber 160 and adjacent to the side wall 158.

The rewind spring 82 is disposed in the spring chamber 160 in the spring cup 84. The rewind spring 82 is a spiral spring having its inner end portion 142 received in the slot 140 in the arbor 136 on the base plate 80. An outer end portion 164 of the rewind spring 82 wraps around the tab 162 on the spring cup 84. The rewind spring 82 biases the spring cup 84 for rotation relative to the base plate 80 in the first direction 154. For purposes of the present invention, it is assumed that the output torque of the rewind spring 82 increases linearly as the rewind spring is wound tighter upon withdrawal of belt webbing 16 from the retractor 10. It should be understood that the rewind spring 82 could be of the type in which the output torque does not increase linearly as the rewind spring is wound tighter.

The spring spool 90 is a one-piece member preferably molded from plastic. A side wall 162 (FIG. 6) of the spring spool 90 extends about the spring spool axis 134. A support hub 164 projects axially from the side wall 162 at one end of the spring spool 90. A cylindrical inner surface 160 (FIGS. 4 and 6) on the side wall 162 of the spring spool 90 is press fit on the spring cup 84 to fix the spring spool for rotation with the spring cup about the spring spool axis 134. The rewind spring 82 thus biases the spring spool 90 for rotation with the spring cup 84, relative to the base plate 80, in the first direction 154.

The side wall 162 of the spring spool 90 has an outer peripheral surface 166 on which is formed a helical groove 170. The surfaces which define the groove 170 form a part of the outer peripheral surface 166 of the spring spool 90. Adjacent turns of the groove 170 are separated by radially projecting lands which are formed as portions of the side wall 162.

The outer peripheral surface 166 of the spring spool 90 has a non-conical configuration. That is, the outer peripheral surface 166 of the spring spool 90 is not a surface generated by a moving line intersecting a fixed curve and passing through a fixed point. Therefore, the change in the radius of the spring spool 90 over any given section of the spring spool having a particular length, is not always the same as the change in the radius of the spring spool over any other equal length section of the spring spool.

The outer peripheral surface 166 of the spring spool 90 is spaced radially outward from the spring spool axis 134. The radius of the outer peripheral surface 166 of the spring spool 90, that is, the distance from the spring spool axis 134 to the root (radially innermost portion) of the groove 170, varies along the axial extent of the groove. This radius, referred to herein as the radius of the spring spool 90, has different predetermined values as measured at selected points on the groove 170 spaced apart axially along the outer peripheral surface 166 of the spring spool. The radius curve for the spring spool 90, that is, the set of all values of the radius of the spring spool from one axial end of the groove 170 to the other axial end of the groove, is selected and determined in a manner described below in detail. The configuration of a spring spool 90 of one exemplary retractor 10, constructed in accordance with the present invention, is also described below in detail.

The shaft spool 100 (FIGS. 2, 4 and 5) is a one-piece plastic molding including a side wall 176 which extends about the belt webbing spool axis 54. The side wall 176 defines a bore 175 in the shaft spool 100. A first axial section 178 of the bore 175 has a circular cross-sectional configuration. A second section 180 of the bore 175 has a rectangular cross sectional configuration and receives the end portion 62 of the belt webbing spool shaft 52. The shaft spool 100 is thereby fixed for rotation with the belt webbing spool shaft 52, and with the belt webbing spool 50, about the belt webbing spool axis 54.

A hub 182 at one end (the right end as viewed in FIGS. 4 and 5) of the shaft spool 100 projects axially from the side wall 176. The hub 182 is supported for rotation in the circular opening 124 (FIG. 4) in the base plate 80. A radially extending end wall 184 of the shaft spool 100 closes the opposite end of the bore 175. Another hub 186 projects axially from the end wall 184 and is supported for rotation on the cover 112 in a manner described below.

The side wall 176 of the shaft spool 100 has an outer peripheral surface 188. A helical groove 190 is formed on the outer peripheral surface 188 of the shaft spool 100. The surfaces which define the groove 190 form a part of the outer peripheral surface 188 of the shaft spool 100. Adjacent turns of the groove 190 are separated by radially projecting lands which are formed as part of the side wall 176 of the shaft spool 100.

The outer peripheral surface 188 of the shaft spool 100 has a non-conical configuration, that is, is not a surface generated by a moving line intersecting a fixed curve and passing through a fixed point. Therefore, the change in the radius of the shaft spool 100 over any given section of the shaft spool having a particular length, is not always the same as the change in the radius of the shaft spool over any other equal length section of the shaft spool.

The outer peripheral surface 188 of the shaft spool 100 is spaced radially outward from the belt webbing spool axis 54. The radius of the outer peripheral surface 188 of the shaft spool 100, that is, the distance from the belt webbing spool axis 54 to the root of the groove 190, varies along the axial length of the shaft spool. This radius, referred to herein as the radius of the shaft spool 100, has different predetermined values as measured at selected points on the groove 190 spaced apart axially along the outer peripheral surface 188 of the shaft spool. The radius curve for the shaft spool 100, that is, the set of all values of the radius of the shaft spool from one axial end of the groove 190 to the other axial end of the groove, is selected and determined in the manner described below. The configuration of a shaft spool 100 of the one exemplary retractor 10, constructed in accordance with the present invention, is also described below in detail.

The cable 110 (FIGS. 2–4 and 7–9) is an elongate flexible member which interconnects the spring spool 90 and the shaft spool 100 in a force-transmitting relationship. The cable 110 is preferably a coated steel wire. An end fitting on one end portion of the cable 110 (FIGS. 2 and 7) is received in a cable lock pocket 194 (FIG. 9) on the right axial end (as viewed in FIG. 7) of the spring spool 90. The cable 110 wraps around a portion of the outer peripheral surface 166 of the spring spool 90, in the groove 170. The cable 110 then extends from a point on the outer peripheral surface 166 of the spring spool 90 to a point on the outer peripheral surface 188 of the shaft spool 100. The cable 110 wraps around a portion of the outer peripheral surface 188 of the shaft spool 100, in the groove 190. A second end portion of the cable 110 terminates in an end fitting which is received in a cable lock pocket 198 in the shaft spool 100.

Figures 7, 8:
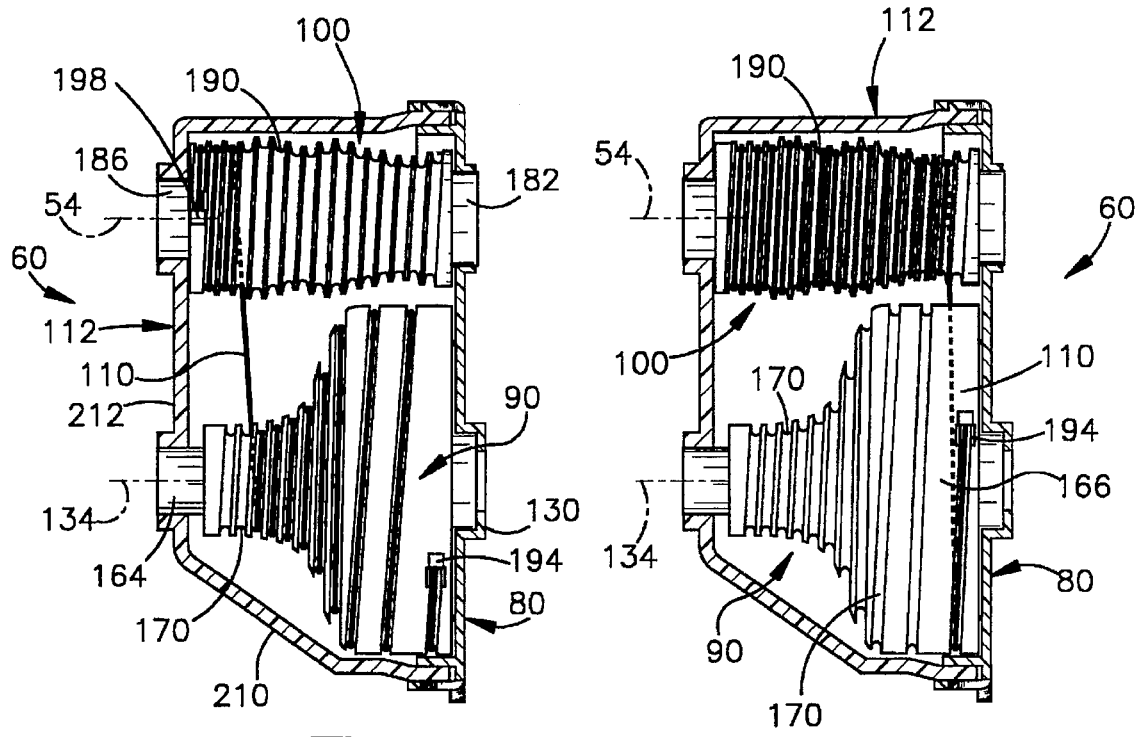
FIG. 7 is a schematic illustration showing the rewind spring assembly in a condition of partial belt webbing withdrawal.
FIG. 8 is a view similar to FIG. 7 showing the rewind spring assembly in a condition of complete belt webbing withdrawal.
Figure 9:
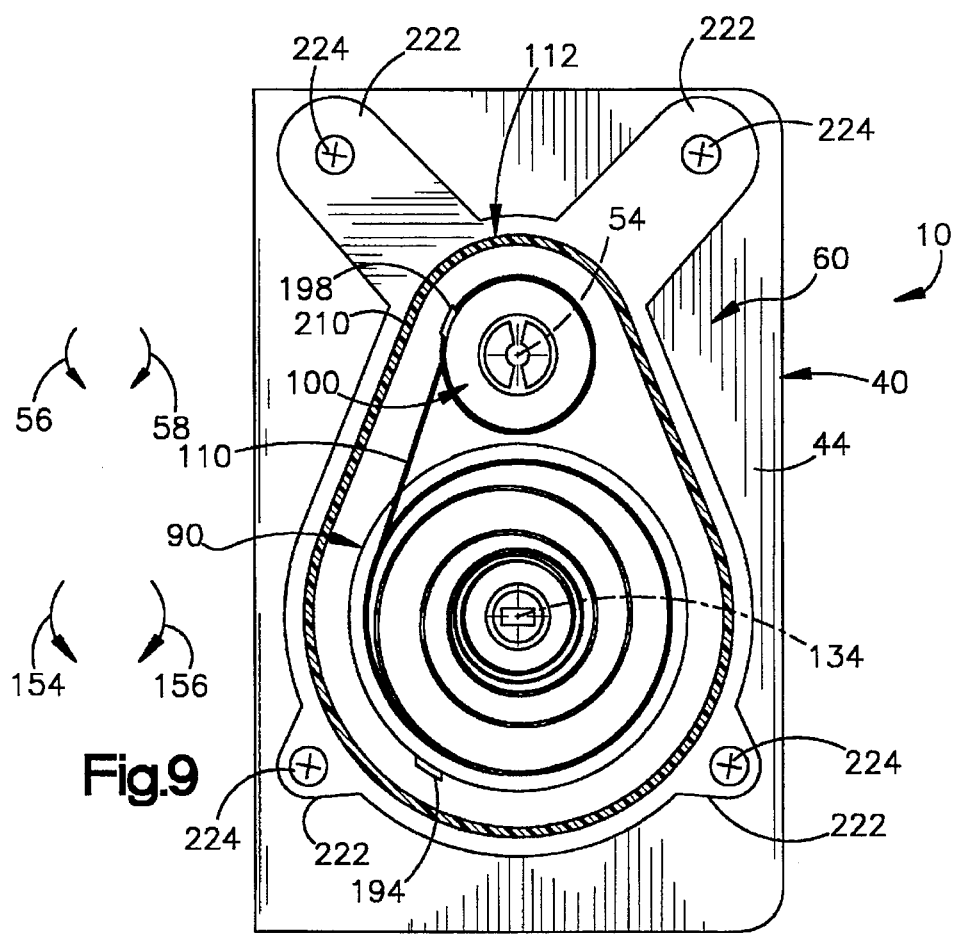
FIG. 9 is a schematic elevational view of the rewind spring assembly.

The cable 110 connects the spools 90 and 100 for simultaneous rotation. When belt webbing 16 is withdrawn from the belt webbing spool 50, the belt webbing spool and the shaft spool 100 rotate in the belt withdrawal direction 58 (FIG. 9). The cable 110 transmits rotational force from the shaft spool 100 to the spring spool 90. The spring spool 90 rotates in the second direction 156, against the bias of the rewind spring 82. The parts of the rewind spring assembly 60 move from the condition shown in FIG. 4, in which substantially all the cable 110 is wound on the spring spool 90 and only a minimal amount of cable is wound on the shaft spool 100, to a condition shown in FIG. 7, in which a greater portion of the cable is unwound from the spring spool and is wound onto the shaft spool. When all or substantially all the belt webbing 16 is withdrawn from the belt webbing spool 50, as shown in FIG. 8, substantially all the cable 110 is unwound from the spring spool 90 and is wound on the shaft spool 100. During retraction of the belt webbing 16 onto the belt webbing spool 50, the rewind spring 82 transmits retraction force from the spring spool 90 through the cable 110 and into the shaft spool 100. The shaft spool 100 rotates in the belt retraction direction 56 and the spring spool 90 rotates in the first direction 154. The cable 110 unwinds from the shaft spool 100 and winds onto the spring spool 90.

The cover 112 (FIGS. 2 and 4) is a one-piece plastic molding having a side wall 210 and an end wall 212. The support hub 186 on the shaft spool 100 is received in a first circular opening 214 in the end wall 212. The shaft spool 100 is thereby supported for rotation on the cover 112. The support hub 164 on the spring spool 90 is received in a second circular opening 216 in the end wall 212 of the cover 112. The spring spool 90 is thereby supported for rotation on the cover 112.

Mating portions 220 on the side wall 210 of the cover 112 engage the four snaps 118 on the base plate 80 to secure the cover to the base plate. The side wall 210 of the cover 112 extends around and encloses the rim portion 116 of the base plate 80. The spring cup 84, the spring 82, the spring spool 90, the shaft spool 100, and the cable 110 are enclosed between the base plate 80 and the cover 112. Four screws 224 (FIG. 9) extend through four feet 222 on the cover 112 and into the side wall 44 of the frame 40. The screws 224 secure the cover 112, and thereby the rewind spring assembly 60 as a whole, to the frame 40 of the retractor 10.

When the seat belt system 12 is engaged as shown in dashed lines in FIG. 1, the torso portion 28 of the belt webbing 16 extends across the torso of the vehicle occupant. The rewind spring assembly 60 of the retractor 10 biases the belt webbing spool 50 for rotation in the belt retraction direction 56. The rewind spring assembly spring 60, acting through the belt webbing spool 50, places a retraction force on the belt webbing 16. This retraction force tensions that section of the belt webbing 16 which extends between the retractor 10 and the buckle 26, including the torso portion 28. The tensile force on the belt webbing 16 can be felt by the vehicle occupant as the torso portion 28 of the belt webbing tends to pull against the torso of the vehicle occupant.

If the retractor 10 exerts too much retraction force on the belt webbing 16, the torso portion 28 of the belt webbing may exert an uncomfortably large amount of force on the torso of the vehicle occupant. The rewind spring assembly 60, however, is designed to minimize discomfort felt by the vehicle occupant as a result of tensile force on the torso portion 28 of the belt webbing 16, while still keeping the belt webbing properly tensioned as needed for safety. Specifically, the radius curves of the spring spool 90 and the shaft spool 100 of the retractor 10 are selected to provide a desired retraction force curve for the rewind spring assembly 60. The retraction force curve is the set of all values of the retraction force exerted on the belt webbing 16 between full belt retraction and full belt withdrawal.

Figure 10:
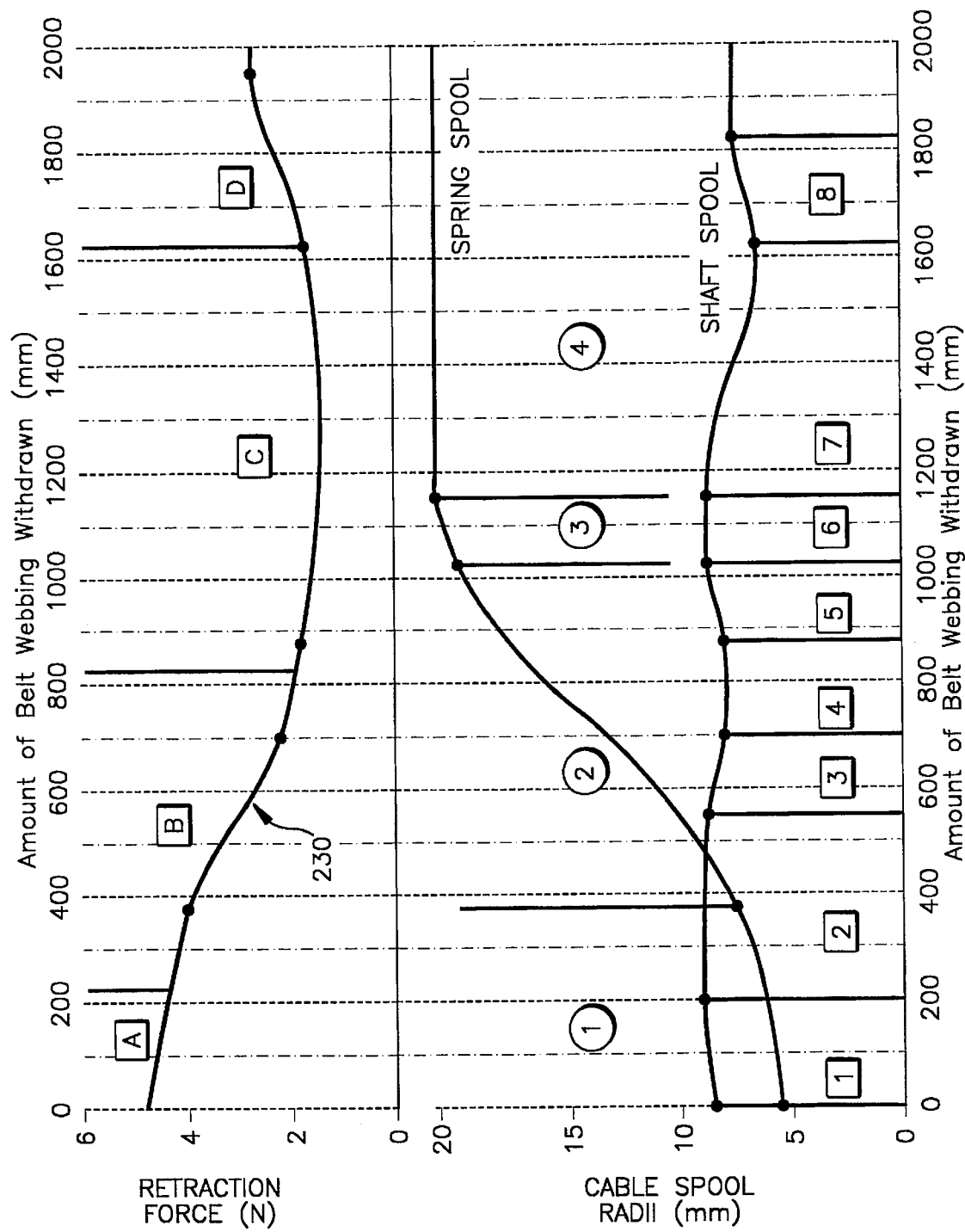
FIG. 10 is a graph which plots the radii of the shaft spool and the spring spool against the amount of belt webbing withdrawn and also against the retraction force on the belt webbing.

A specific desired retraction force curve 230 for an exemplary retractor 10 is shown graphically in the chart in FIG. 10. Table 1 below shows, in tabular form, a series of data points along the retraction force curve 230. It should be understood that the retraction force curve 230 is only one of a large number of usable retraction force curves.

TABLE 1

| Belt withdrawal distance in mm. | Retraction Force in Newtons |
| --- | --- |
| 0 | 4.8 |
| 200 | 4.4 |
| 375 | 4.0 |
| 700 | 2.2 |
| 875 | 1.8 |
| 1625 | 1.7 |
| 1950 | 2.7 |

Because of known factors such as friction and hysteresis, the retraction force curve of a spring biased seat belt system such as the system 12 is different in magnitude and shape from the force curve obtained during withdrawal of belt webbing 16. Because the present application is primarily concerned with the force exerted by the shoulder belt webbing 28 on the torso of the vehicle occupant, that is, under the attempted rewinding influence of the rewind spring 82, the retraction force curve is discussed herein.

In FIG. 10, the desired retraction force curve 230 is divided, for purposes of illustration, into four sections or zones "A" through "D". The first zone "A", a webbing stowage zone, represents the part of the force curve 230 in which all or substantially all of the belt webbing 16 is wound on the belt webbing spool 50. The retraction force in zone "A" is relatively high in order to ensure complete retraction of belt webbing 16 onto the belt webbing spool 50. The retraction force curve 230 has its highest values in the webbing stowage zone "A". In the particular force curve 230, the retraction force varies between about 5 Newtons and 4 Newtons over zone "A".

The second zone "B", a transition zone, represents the part of the force curve 230 in which a substantial portion of the belt webbing 16 is unwound from the belt webbing spool 50, but not enough to be buckled around the vehicle occupant. The retraction force exerted by the rewind spring assembly 60 on the belt webbing 16 decreases fairly rapidly in this zone, as more belt webbing is withdrawn, toward a comfort level in the succeeding zone "C". In the specific retraction force curve 230, the retraction force decreases in zone "B" from about 4 Newtons to about 2 Newtons as belt webbing is withdrawn.

The third zone "C", an occupant use zone, represents the portion of the force curve 230 in which sufficient belt webbing 16 is unwound from the belt webbing spool 50 so as to be engaged about the vehicle occupant. The retraction force on the belt webbing 16, i.e., the value of the retraction force curve 230, is at its lowest level in the occupant use zone "C". The level of retraction force in this zone is low enough to ensure comfort to the vehicle occupant but also high enough to keep the torso portion 28 of the belt webbing 16 safely tensioned about the torso of the vehicle occupant. The level of retraction force remains generally constant over the extent of the occupant use zone "C". In the specific retraction force curve 230 illustrated in FIG. 10, the retraction force varies between about 1.8 Newtons and about 1.7 Newtons.

The fourth zone "D" represents the portion of the retraction force curve 230 in which the belt webbing 16 is completely or almost completely unwound from the belt webbing spool 50, that is, past the point at which the belt webbing would be restraining a vehicle occupant in a position seated against the seatback portion of the vehicle seat 14. The value of the retraction force curve 230, that is, the amount of force exerted on the belt webbing 16, increases over the extent of this zone, although not rising to the initial high level of zone "A". In the exemplary retractor 10 the retraction force increases in zone "D" to about 2.7 Newtons, to ensure commencement of retraction of belt webbing 16 into the retractor 10 even when the belt is fully unwound from the belt webbing spool 50. This increased force level is desirable to start the first wrap of belt webbing onto the belt webbing spool 50. Also, with the large amount of belt webbing 16 extended from the retractor 10, frictional forces of the belt webbing on surfaces on the vehicle occupant and the seat 14 can most strongly resist retraction of the belt webbing onto the retractor 10. The increase in retraction force which is provided in zone "D" also ensures that there is enough torque on the seat belt webbing spool 50 to engage an optional cinch mechanism of the retractor 10.

The desired force curve 230 is obtained by appropriately configuring the outer peripheral surfaces 166 and 188 of the spring spool 90 and shaft spool 100, respectively—that is, by determining the radius curves for the spring spool and the shaft spool. This determination is made in accordance with the following Equation 1. In Equation 1, it is assumed that the cable 110 extends between (a) one of a plurality of first positions on the outer peripheral surface 166 of the spring spool 90 and (b) a corresponding one of a plurality of second positions on the outer peripheral surface 188 of the shaft spool 100. In Equation 1, the value of the desired retraction force curve at any given point is an input factor when determining the radii and thus the shapes of the spring spool 90 and the shaft spool 100.

$$F_r = \frac{\left(\frac{T_r}{R_p}\right) \times R_h}{(n \times t) + R_w} \times f$$

Equation 1 where:
a. $F_r$=the retraction force applied by the belt webbing spool 50 to the belt webbing 16 when the cable 110 extends from the spring spool 90 at the one first position, as measured in Newtons;
b. $T_r$=the retraction torque applied by the rewind spring 82 to the spring spool when the cable extends from the spring spool at the one first position, as measured in Newton-millimeters;
c. $R_p$=the radius of the spring spool when the cable extends from the spring spool at the one first position, as measured in millimeters;
d. $R_h$=the radius of the shaft spool 100 when the cable extends from the shaft spool at the corresponding one second position, as measured in millimeters;
e. $R_w$=the radius of the belt webbing spool when no belt webbing is wound, on the belt webbing spool, as measured in millimeters;
f. n=the number of wraps of the belt webbing on the belt webbing spool when the cable extends from the spring spool at the one first position;
g. t=the thickness of one wrap of the belt webbing on the belt webbing spool, as measured in millimeters; and
h. f=a factor for friction (a number without units).

Certain other factors which are not accounted for in Equation 1 must be observed in determining the radius curves of the spring spool 90 and the shaft spool 100. For example, both the spring spool 90 and the shaft spool 100 have a minimum allowable spool radius, as determined by the thickness and the flexibility of the cable 110. A cable 110 with a diameter of 0.8 mm is used in the exemplary retractor 10, specifically, part number CF-2784 available from Cable Manufacturing and Assembly Co., Inc., of Rockaway, N.J. A minimum spool radius of about 5.5 mm must be maintained for this particular cable. Also, the radius of both the spring spool 90 and the shaft spool 100 should not change by more than 3 mm for each wrap of cable, to allow smooth payout of the cable 110.

Further, a minimum axial wrap separation must be maintained between the wraps or turns of the cable 110 on the spools 90 and 100. In the exemplary retractor 10, the cable diameter of 0.8 mm necessitates about 2 mm of axial separation between adjacent wraps of cable on each of the spring spool 90 and the shaft spool 100.

The presence of the rewind spring 82 must also be taken into account in determining the configuration of the spring spool 90. The large radius portion 232 (to the right as viewed in FIG. 6) of the spring spool 90, which encloses the rewind spring 82, must have a minimum radius to accommodate the rewind spring 82 and the spring cup 84. In the exemplary retractor 10, the diameter of the rewind spring 82 necessitates a minimum radius of about 20 mm for the large radius portion 232 of the spring spool 90. The portion 232 of the spring spool 90 also must have a certain axial extent (as measured in a direction from left to right in FIG. 6) to accommodate the strip width or axial height of the rewind spring 82. In the exemplary retractor 10, the rewind spring 82 has a strip width of about 5 mm.

In the exemplary retractor 10, the belt webbing spool 50 rotates fourteen times between a condition of full belt withdrawal and a condition of full belt retraction. Thus, the shaft spool 100, which is fixed for rotation with the belt webbing spool 50, also rotates fourteen times between full belt withdrawal and full belt retraction. Accordingly, a minimum of fourteen wraps of cable 110 are needed on the shaft spool 100. One extra wrap of cable is provided at each end to ensure that the cable 110 does not come off the shaft spool 100.

The length of the shaft spool 100 is determined by the fact that fourteen wraps of cable 110 are needed, plus one extra wrap at each end, at a 2 mm minimum separation between wraps. It is preferable that the angle at which the cable 110 extends between the spring spool 90 and the shaft spool 100 be as close as possible to a right angle to the axes 54 and 134. Therefore, the spring spool 90 is preferably about the same length as the shaft spool 100.

Because the spring spool 90 has a large radius portion 232 enclosing the rewind spring 82, the average radius of the spring spool is greater than the average radius of the shaft spool. Accordingly, the total number of wraps of cable 110 on the spring spool 90, specifically about 9 wraps, is less than the total number of wraps of cable on the shaft spool 100. Since the spring spool 90 is preferably about the same length as the shaft spool 100, then the axial separation between wraps of cable 110 on the spring spool is, on the average, greater than the axial separation of wraps of cable on the shaft spool 100.

Further, the axial separation between adjacent wraps of cable 110 on the spring spool 90 varies significantly along the axial extent of the spring spool. For example, each wrap of cable 110 on the large radius portion 232 of the spring spool 90 has a relatively large circumferential extent, and so only two wraps of cable on the spool portion 232 account for the same length of cable as six corresponding wraps on the shaft spool 100. As a result, the axial separation between adjacent wraps of cable 110 is relatively large on the large radius portion 232 of the spring spool. On other portions of the spring spool 90, the axial separation between adjacent wraps of cable 110 is preferably maintained about the same as the axial separation between corresponding wraps of cable on the shaft spool 100.

The shapes of the spring spool 90 and the shaft spool 100 are functions of the desired forced curve 230. For the exemplary retractor 10, which has the desired retraction force curve 230, the resultant radius curves for the spring spool 90 and the shaft spool 100 are shown graphically in FIG. 10 which plots the spool radius against the amount of belt webbing withdrawn. Selected data points from these radius curves are also shown in Tables 2 and 3, respectively.

TABLE 2

| Spring Spool Radius | |
| --- | --- |
| Amount Of Webbing Withdrawn | Spool Radius in millimeters |
| 0 mm | 5.5 mm |
| 375 mm | 7.5 mm |
| 1025 mm | 19 mm |
| 1150 mm | 20 mm |
| over 1150 mm | 20 mm |

TABLE 3

Shaft Spool Radius

| Amount Of Webbing Withdrawn | Spool Radius in millimeters |
| --- | --- |
| 0 mm | 8.5 mm |
| 200 mm | 9.0 mm |
| 550 mm | 8.75 mm |
| 700 mm | 8.0 mm |
| 875 mm | 8.0 mm |
| 1025 mm | 8.75 mm |
| 1150 mm | 8.75 mm |
| 1625 mm | 6.5 mm |
| 1825 mm | 7.5 mm |

In the process of determining these radius curves, the shaft spool 100 and the spring spool 90 are each divided into fourteen hypothetical "elements". Each element on the shaft spool 100 corresponds to one rotation of the shaft spool, i.e, one 360° wrap of cable 110 on the shaft spool. Each wrap of cable 110 on the shaft spool 100 contains a length of cable equal to the circumference of the shaft spool at that point—i.e., 2π times the radius of the shaft spool at that point. Each element on the spring spool 90 corresponds to the length of cable 110 which is wrapped around the corresponding element of the shaft spool 100. These elements, and corresponding radius curve data points from the radius curves of the spools 90 and 100, are shown in Table 4.

Table 4 lists for each element the radius of the spring spool 90 and the corresponding radius of the shaft spool 00. Table 4 also lists the shaft spool wrap angle, that is, the number of degrees of wrap of each element (length) of cable 110 on the shaft spool 100. For each element the shaft spool wrap angle is 360° because each element by definition corresponds to one rotation of the shaft spool 100, that is, one 360° wrap of cable 110 on the shaft spool. Because the radius of the shaft spool 100 varies, the length of cable 110 which is accommodated over any given 360° wrap of cable on the shaft spool varies.

Table 4 also lists the spring spool wrap angle for each element, that is, the number of degrees of wrap of that element (length) of cable 110 on the spring spool 90. The spring spool wrap angle varies from an angle which is more than 360° to an angle which is less than 360°, because the radius of the spring spool 90 varies from a radius which is less than the radius of the shaft spool 100 for that element to a radius which is more than the radius of the shaft spool for that element. Because the spool radii change smoothly rather than in discrete jumps, spool radius is usually not constant for any given wrap of cable. The calculations are, therefore, approximate, and discrete calculated data points are embodied physically in smoothed curves.

TABLE 4

| Element | Spring Spool Radius | Spring Spool Wrap Angle | Shaft Spool Radius | Shaft Spool Wrap Angle |
| --- | --- | --- | --- | --- |
| 1 | 5.5 | 550° | 8.4 | 360° |
| 2 | 6.5 | 498° | 9.0 | 360° |
| 3 | 7.5 | 422° | 8.8 | 360° |
| 4 | 10.5 | 305° | 8.9 | 360° |
| 5 | 13.5 | 216° | 8.1 | 360° |
| 6 | 16.5 | 176° | 8.1 | 360° |
| 7 | 19.0 | 166° | 8.8 | 360° |
| 8 | 20.0 | 156° | 8.7 | 360° |
| 9 | 20.0 | 145° | 8.1 | 360° |
| 10 | 20.0 | 136° | 7.6 | 360° |
| 11 | 20.0 | 127° | 7.1 | 360° |
| 12 | 20.0 | 117° | 6.5 | 360° |
| 13 | 20.0 | 124° | 6.9 | 360° |
| 14 | 20.0 | 136° | 7.6 | 360° |

Because the spring spool 90 has more structural constraints on it than does the shaft spool 100, the configuration of the spring spool is for the exemplary retractor 10 initially used as an input, together with the desired force curve 230, to generate the configuration of a portion of the shaft spool. Specifically, because of the presence of the rewind spring 82 inside the spring spool 90, elements 8–14 of the radius curve of the spring spool all have the same value, specifically, 20 mm. Since the radius of the spring spool 90 and the desired force curve 230 are both known for elements 8–14, then use of Equation 1 determines the corresponding radius points for elements 8–14 of the shaft spool 100.

Elements 8–14 of the spring spool 90 and the shaft spool 100, as determined in this manner, correspond to belt withdrawal in the range of from about 50% of belt withdrawal to 100% of belt withdrawal. It then remains to determine the values for elements 1–7, which correspond to belt withdrawal in the range of from 0% of belt withdrawal to about 50% of belt withdrawal. The values of the force curve 230 are generally higher overall for elements 1–7 than for elements 8–14. In order to obtain these higher values of the force curve 230, it is preferable to have a progressively higher level of output torque exerted by the spring spool 90 on the cable 110, and thus on the belt webbing 16, as progressively more belt webbing is retracted onto the belt webbing spool 50. The output torque exerted by the spring spool 90 can be increased by decreasing the radius of the spring spool, since torque equals force times distance.

Figure 4:
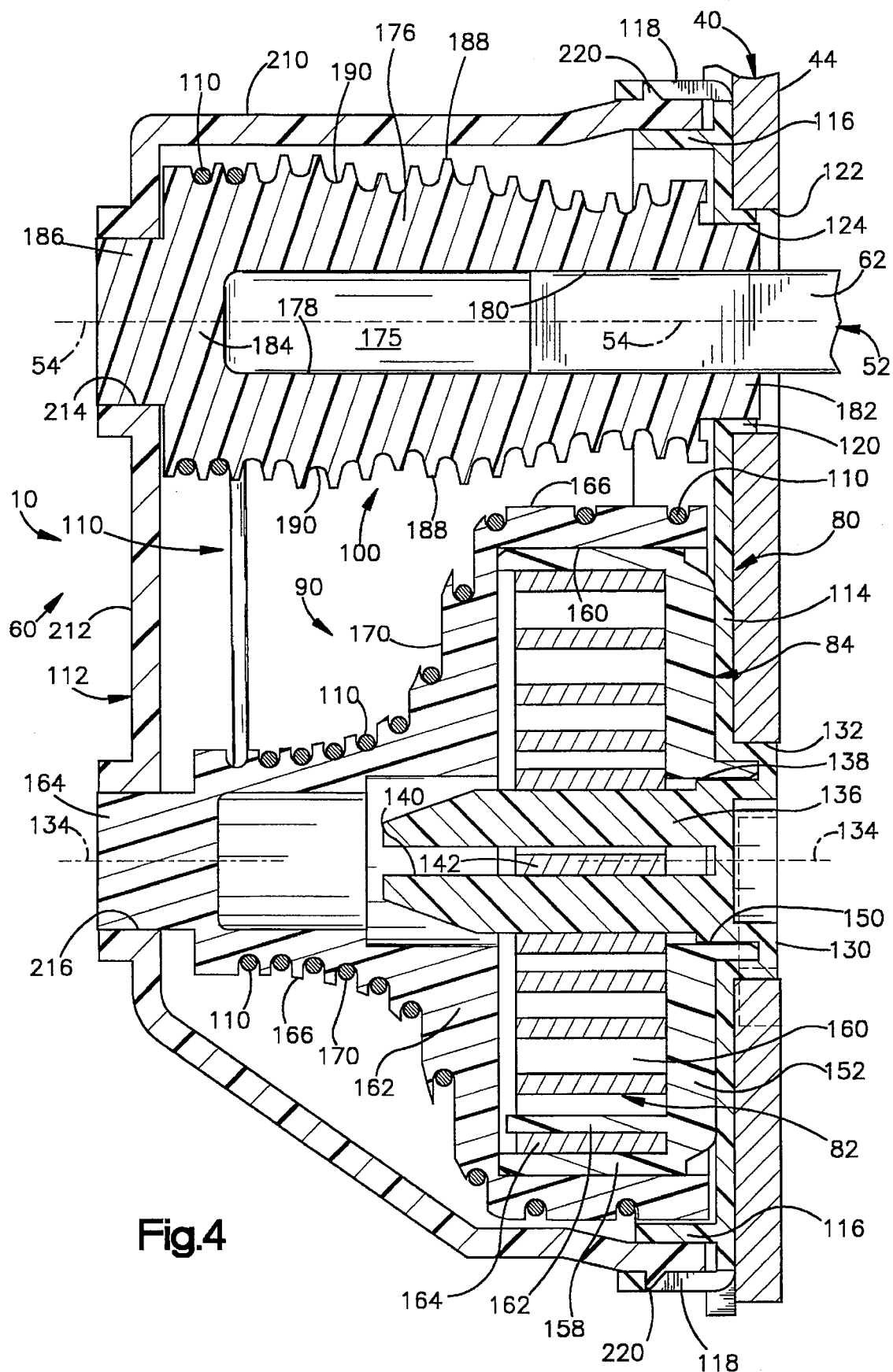
FIG. 4 is an enlarged sectional view of the rewind spring assembly.
Figure 6:
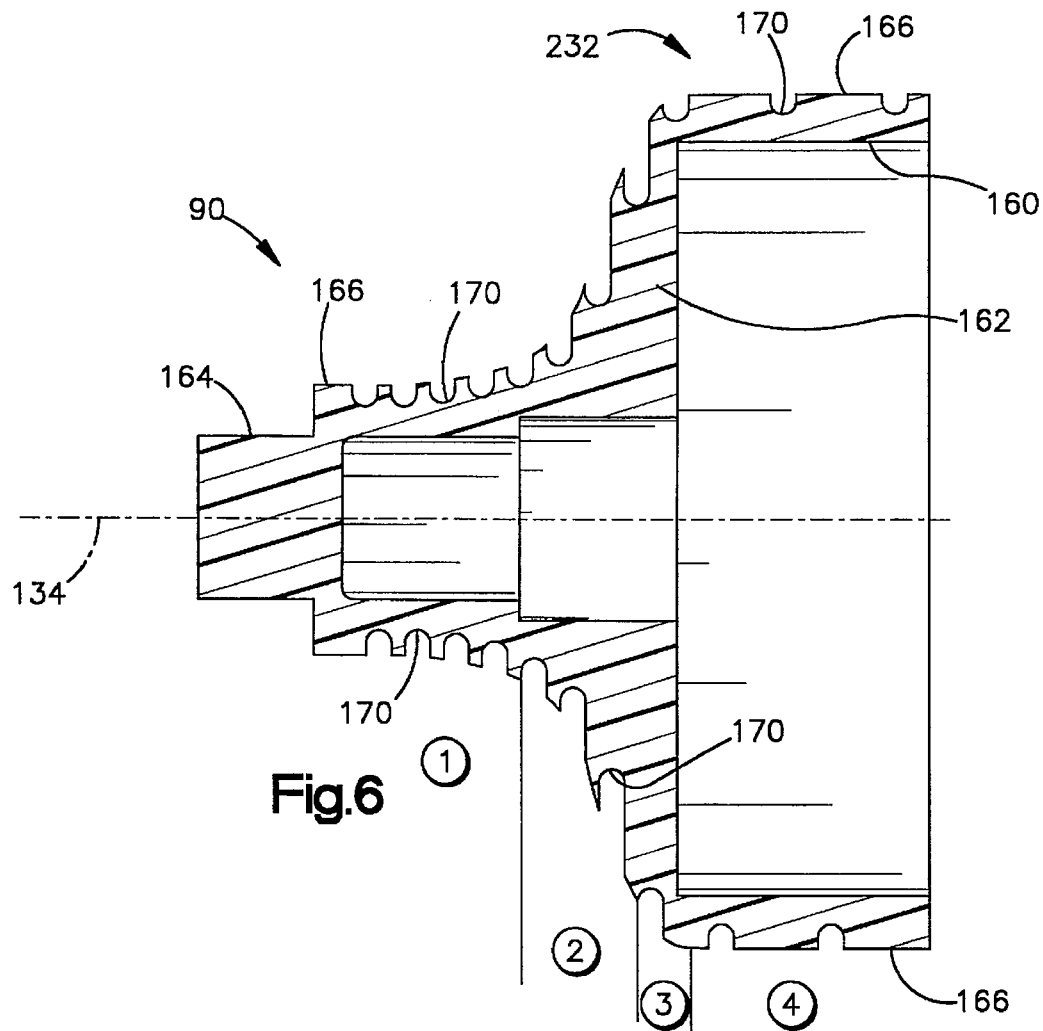
FIG. 6 is a sectional view of a spring spool which forms a part of the rewind spring assembly of the retractor of FIG. 1.

Accordingly, the radius of the spring spool 90 preferably decreases from element 8 back to element 1—that is, in a direction from right to left as viewed in FIGS. 4 and 6. If the radius of the spring spool 90 immediately drops down to a radius of 5.5 mm, the minimum allowable spring spool radius, then given the desired force curve 230, the corresponding radius of the shaft spool 100 is in the range of about 3 mm. This value is unacceptably small given the minimum allowable radius of the shaft spool 100. Thus, the radius curve of the spring spool 90 can not drop from 20 mm to 5.5 mm within one element. Instead, the transition must be more gradual.

The final values for elements 1–7 of the radius curves of the spring spool 90 and the shaft spool 100 are then determined in a known manner through repeated further computations using Equation 1, taking into account the physical constraints of the spools and the fact that seven more wraps of cable 110 on the shaft spool are to be accounted for. The resulting radius curves are described below in detail. The radius curves generated from the calculated data points are represented graphically in the curves shown in FIG. 10 and are embodied physically in the illustrated spools 90 and 100. It should be understood that because of drawing limitations, the illustrated configurations of the spools 90 and 100 in FIGS. 2–9 are not necessarily accurate representations of the calculated data points and radius curves. The calculated data points for the radius curves are set forth in Table 4.

The configuration of the spring spool 90 as shown in FIG. 6 can be described as including four sections labeled 1–4 in FIGS. 6 and 10 and in Table 2. The cable 110 extends from the first section of the spring spool 90 when up to about 375 mm of the belt webbing 16 is withdrawn from the belt webbing spool 50. The radius of the spring spool 90 in this first section increases gradually from about 5.5 mm to about 7.5 mm, as measured at points taken sequentially from the left end (as viewed in FIG. 6) of the section toward the right. This section is coextensive with all of zone "A" and part of zone "B" of the retraction force curve 230.

The cable 110 extends from the second section of the spring spool 90 when from about 375 mm to about 1025 mm of belt webbing 16 is withdrawn from the belt webbing spool 50. The radius of the spring spool 90 in this second section increases relatively rapidly as measured at points taken sequentially from the left end (as viewed in FIG. 6) of the section toward the right. Specifically, the radius increases from about 7.5 mm at about 375 mm of belt webbing extraction, to about 19 mm at about 1,025 mm of belt webbing extraction. This second section of the radius curve of the spring spool 90 is coextensive with the remainder of zone "B" and part of zone "C" of the retraction force curve 230.

In the third section of the spring spool 90, the radius increases only gradually as measured at points taken sequentially from the left end (as viewed in FIG. 6) of the section toward the right. Specifically, the radius increases from about 19 mm to 20 mm during belt webbing withdrawal from about 1,025 mm to 1,150 mm. This section of the radius curve of the spring spool 90 is coextensive with a portion of zone "C" of the retraction force curve 230.

The cable 110 extends from the fourth section of the spring spool 90 when substantially more than half of the belt webbing 16 is unwound from the belt webbing spool 50. The radius of the spring spool 90 in this fourth section is substantially constant as measured at points taken sequentially from the left end (as viewed in FIG. 6) of the section toward the right. As can be seen in FIG. 10, when the amount of belt webbing withdrawn exceeds about 1,150 mm, the radius of the spring spool 90 remains at a constant 20 mm. This section of the radius curve of the spring spool covers the remainder of zone "C" and all of zone "D" of the retraction force curve 230.

Figure 5:
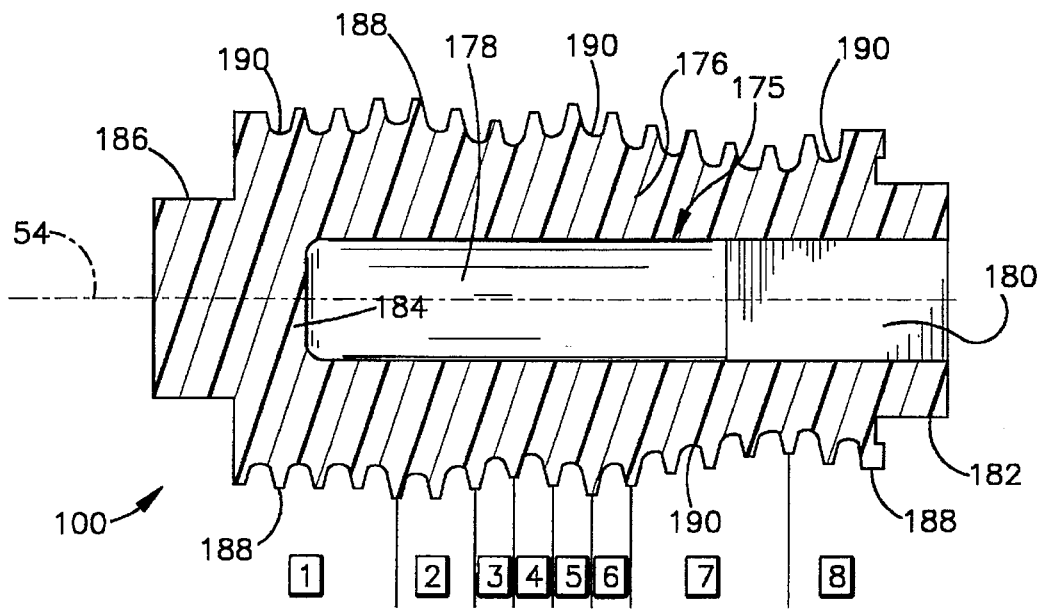
FIG. 5 is a sectional view of a shaft spool which forms a part of the rewind spring assembly.

The shaft spool 100, as seen in FIG. 5, has a radially undulating configuration and can be described as including eight sections labeled 1–8 in FIGS. 5 and 10 and in Table 3. In the first section of the shaft spool 100, from which the cable 110 extends when up to about 200 mm of belt webbing 16 is withdrawn, the spool radius increases gradually from about 8.5 mm to about 9 mm. In a second section of the shaft spool 100, from which the cable 110 extends when from about 200 mm to about 550 mm of belt webbing is withdrawn, the spool radius decreases gradually from about 9.0 mm to about 8.75 mm. In a third section of the shaft spool 100, from which the cable 110 extends when from about 550 mm to about 700 mm is withdrawn, the spool radius decreases from about 8.75 mm to about 8 mm.

In a fourth section of the shaft spool 100, from which the cable 110 extends when from about 700 mm to about 875 mm of belt webbing 16 is withdrawn, the radius is substantially constant at about 8 mm. Over a fifth section of the shaft spool 100, from which the cable 110 extends when from about 875 mm to about 1,025 mm of belt webbing 16 is withdrawn, the radius of the shaft spool increases from about 8 mm to about 8.75 mm. In a sixth section of the shaft spool 100, from which the cable 110 extends when from about 1,025 mm to about 1,150 mm of belt webbing 16 is withdrawn, the radius of the shaft spool remains substantially constant at about 8.75 mm.

In a seventh section of the shaft spool 100, from which the cable 110 extends when from about 1,150 mm to about 1,625 mm of belt webbing 16 is withdrawn, the radius of the shaft spool decreases from about 8.7 mm to about 6.5 mm. In the eighth and final section of the shaft spool 100, from which the cable 110 extends when over about 1,625 mm of belt webbing 16 is withdrawn, the radius of the shaft spool increases from about 6.5 mm to about 7.5 mm. In the exemplary retractor 10, this radius curve for the shaft spool 100, together with the radius curve described above for the spring spool 90, produces the desired retraction force curve 230.

From the above description of the invention, those skilled in the art will perceive improvements, changes and modifications in the invention. For example, the rewind spring 82 can be located remotely from the spring spool 90, so that accommodations for the size of the rewind spring do not have to be made in determining the radius curve of the spring spool. Such improvements, changes and modifications within the skill of the art are intended to be covered by the appended claims.

Having described the invention, we claim:

1. A vehicle occupant safety apparatus comprising:

a belt webbing spool supported for rotation about a belt webbing spool axis in a belt retraction direction and an opposite belt withdrawal direction;

a length of belt webbing wound on said belt webbing spool, said belt webbing being extensible about a vehicle occupant to restrain the occupant;

a shaft spool fixed for rotation with said belt webbing spool in the belt retraction direction and in the belt withdrawal direction, said shaft spool having an outer peripheral surface, said outer peripheral surface of said shaft spool having a non-conical configuration;

a spring spool supported for rotation about a spring spool axis in first and second opposite directions, said spring spool axis being spaced apart from said belt webbing spool axis, said spring spool having an outer peripheral surface, said outer peripheral surface of said spring spool having a non-conical configuration;

a rewind spring connected with said spring spool for biasing said spring spool for rotation in the first direction to apply retraction force to said spring spool; and an elongate flexible member extending between said outer peripheral surface of said spring spool and said outer peripheral surface of said shaft spool for transmitting retraction force from said spring spool to said shaft spool to bias said belt webbing spool for rotation in the belt retraction direction;

said rewind spring being enclosed within a first portion of said spring spool;

said first portion of said spring spool having a minimum radius as determined by the diameter of said rewind spring and having a minimum axial length as determined by the axial height of said rewind spring, the radius of said spring spool being substantially constant over the axial extent of said first portion of said spring spool.

2. A vehicle occupant safety apparatus as set forth in claim 1 wherein said rewind spring is wound tighter upon belt withdrawal and the output torque of said rewind spring increases as said rewind spring is wound tighter.

3. A vehicle occupant safety apparatus comprising:

a belt webbing spool supported for rotation about a belt webbing spool axis in a belt retraction direction and an opposite belt withdrawal direction;

a length of belt webbing wound on said belt webbing spool, said belt webbing being extensible about a vehicle occupant to restrain the occupant;

a shaft spool fixed for rotation with said belt webbing spool in the belt retraction direction and in the belt withdrawal direction, said shaft spool having an outer peripheral surface, said outer peripheral surface of said shaft spool having a non-conical configuration;

a spring spool supported for rotation about a spring spool axis in first and second opposite directions, said spring spool axis being spaced apart from said belt webbing spool axis, said spring spool having an outer peripheral surface, said outer peripheral surface of said spring spool having a non-conical configuration;

a rewind spring connected with said spring spool for biasing said spring spool for rotation in the first direction to apply retraction force to said spring spool; and an elongate flexible member extending between said outer peripheral surface of said spring spool and said outer peripheral surface of said shaft spool for transmitting retraction force from said spring spool to said shaft spool to bias said belt webbing spool for rotation in the belt retraction direction;

said non-conical configuration of said outer peripheral surface of said spring spool including:

a first portion of said spring spool from which said flexible member extends when a relatively small amount of said belt webbing is withdrawn from said belt webbing spool, the radius of said first portion of said spring spool gradually increasing over the axial extent of said first portion of said spring spool;

a second portion of said spring spool from which said flexible member extends when substantially more than a small amount of said belt webbing is withdrawn from said belt webbing spool, the radius of said second portion of said spring spool rapidly increasing over the axial extent of said second portion of said spring spool; and a third portion of said spring spool from which said flexible member extends when from about half to all of said belt webbing is withdrawn from said belt webbing spool, the radius of said spring spool being substantially constant over the axial extent of said third portion of said spring spool.

4. A vehicle occupant safety apparatus comprising:

a belt webbing spool supported for rotation about a belt webbing spool axis in a belt retraction direction and an opposite belt withdrawal direction;

a length of belt webbing wound on said belt webbing spool, said belt webbing being extensible about a vehicle occupant to restrain the occupant;

a shaft spool fixed for rotation with said belt webbing spool in the belt retraction direction and in the belt withdrawal direction, said shaft spool having an outer peripheral surface, said outer peripheral surface of said shaft spool having a non-conical configuration;

a spring spool supported for rotation about a spring spool axis in first and second opposite directions, said spring spool axis being spaced apart from said belt webbing spool axis, said spring spool having an outer peripheral surface, said outer peripheral surface of said spring spool having a non-conical configuration;

a rewind spring connected with said spring spool for biasing said spring spool for rotation in the first direction to apply retraction force to said spring spool; and an elongate flexible member extending between said outer peripheral surface of said spring spool and said outer peripheral surface of said shaft spool for transmitting retraction force from said spring spool to said shaft spool to bias said belt webbing spool for rotation in the belt retraction direction;

said outer peripheral surface of said shaft spool having a radially undulating configuration with a radius which both increases and decreases a plurality of times over the axial length of said shaft spool.

5. A vehicle occupant safety apparatus as set forth in claim 4 wherein said outer peripheral surface of said shaft spool includes eight axially spaced sections, said flexible member extending from a first one of said sections when only a minimal amount of said belt webbing is withdrawn from said belt webbing spool and said flexible member extending from an eighth one of said sections when substantially all of said belt webbing is withdrawn from said belt webbing spool, said first section being disposed adjacent to a first axial end of said shaft spool and said eighth section being disposed adjacent to a second opposite axial end of said shaft spool;

said radius of said shaft spool increasing in said first section between said first axial end of said shaft spool and a second one of said sections;

said radius of said shaft spool decreasing in said second section, between said first section and a third one of said sections;

said radius of said shaft spool decreasing in said third section, between said second section and a fourth one of said sections;

said radius of said shaft spool being substantially constant in said fourth section;

said radius of said shaft spool increasing in a fifth one of said sections, between said fourth section and a sixth one of said sections;

said radius of said shaft spool being substantially constant in said sixth section;

said radius of said shaft spool decreasing in a seventh one of said sections, between said sixth section and said eighth section; and said radius of said shaft spool increasing in said eighth section between said seventh section and said second axial end of said shaft spool.

6. A vehicle occupant safety apparatus comprising:

a belt webbing spool supported for rotation about a belt webbing spool axis in a belt retraction direction and an opposite belt withdrawal direction;

a length of belt webbing wound on said belt webbing spool, said belt webbing being extensible about a vehicle occupant to restrain the occupant;

a shaft spool fixed for rotation with said belt webbing spool in the belt retraction direction and in the belt withdrawal direction, said shaft spool having an outer peripheral surface, said outer peripheral surface of said shaft spool having a non-conical configuration;

a spring spool supported for rotation about a spring spool axis in first and second opposite directions, said spring spool axis being spaced apart from said belt webbing spool axis, said spring spool having an outer peripheral surface, said outer peripheral surface of said spring spool having a non-conical configuration;

a rewind spring connected with said spring spool for biasing said spring spool for rotation in the first direction to apply retraction force to said spring spool; and an elongate flexible member extending between said outer peripheral surface of said spring spool and said outer peripheral surface of said shaft spool for transmitting retraction force from said spring spool to said shaft spool to bias said belt webbing spool for rotation in the belt retraction direction;

said flexible member extending from one of a plurality of axially spaced first positions on said outer peripheral surface of said spring spool and from a corresponding one of a plurality of axially spaced second positions on said outer peripheral surface of said shaft spool; and wherein the radius of said spring spool at said one first position and the radius of said shaft spool at said corresponding one second position are determined in accordance with the equation:

$$F_r = \frac{\left(\frac{T_r}{R_p}\right) \times R_h}{(n \times t) + R_w} \times f$$

where:
a. Fr=the retraction force applied by said belt webbing spool to said belt webbing when said flexible member extends from said spring spool at said one first position;
b. Tr=the retraction torque applied by said rewind spring to said spring spool when said flexible member extends from said spring spool at said one first position;
c. Rp=the radius of said spring spool when said flexible member extends from said spring spool at said one first position;
d. Rh=the radius of said shaft spool when said flexible member extends from said shaft spool at said corresponding one second position;
e. Rw=the radius of said belt webbing spool when no belt webbing is wound on said belt webbing spool;
f. n=the number of wraps of said belt webbing on said belt webbing spool when said flexible member extends from said spring spool at said one first position;
g. t=the thickness of one wrap of said belt webbing; and
h. f=a factor for friction.

7. A vehicle occupant safety apparatus comprising:
a belt webbing spool supported for rotation about a belt webbing spool axis in a belt retraction direction and an opposite belt withdrawal direction;
a length of belt webbing wound on said belt webbing spool, said belt webbing being extensible about a vehicle occupant to restrain the occupant;
a rewind spring for biasing said belt webbing spool for rotation in the belt retraction direction to apply retraction force to said belt webbing; and
means connected between said rewind spring and said belt webbing spool for applying the retraction force of said rewind spring to said belt webbing spool, said means for applying comprising:
(a) means for applying retraction force of a first level to said belt webbing spool when said belt webbing is completely wound on said belt webbing spool;
(b) means for reducing the retraction force applied to said belt webbing spool, upon withdrawal of belt webbing from said belt webbing spool, from the first level to a second level; and
(c) means for increasing the level of the retraction force applied to said belt webbing spool from the second level to a third level as said belt webbing is fully withdrawn from said belt webbing spool;

said means for applying the retraction force of said rewind spring to said belt webbing spool comprising:
a shaft spool fixed for rotation with said belt webbing spool in the belt retraction direction and in the belt withdrawal direction, said shaft, spool having an outer peripheral surface;
a spring spool supported for rotation about a spring spool axis in first and second opposite directions, said spring spool axis being spaced apart from said belt webbing spool axis, said spring spool having an outer peripheral surface; and
an elongate flexible member extending between said outer peripheral surface of said spring spool and said outer peripheral surface of said shaft spool for transmitting retraction force from said spring spool to said shaft spool to bias said belt webbing spool for rotation in the belt retraction direction;

said flexible member extending from one of a plurality of axially spaced first positions on said outer peripheral surface of said spring spool and from a corresponding one of a plurality of axially spaced second positions on said outer peripheral surface of said shaft spool; and wherein the radius of said spring spool at said one first position and the radius of said shaft spool at said corresponding one second position are determined in accordance with the equation:

$$F_r = \frac{\left(\frac{T_r}{R_p}\right) \times R_h}{(n \times t) + R_w} \times f$$

where:
a. Fr=the retraction force applied by said belt webbing spool to said belt webbing when said flexible member extends from said spring spool at said one first position;
b. Tr=the retraction torque applied by said rewind spring to said spring spool when said flexible member extends from said spring spool at said one first position;
c. Rp=the radius of said spring spool when said flexible member extends from said spring spool at said one first position;
d. Rh=the radius of said shaft spool when said flexible member extends from said shaft spool at said corresponding one second position;
e. Rw=the radius of said belt webbing spool when no belt webbing is wound on said belt webbing spool;
f. n=the number of wraps of said belt webbing on said belt webbing spool when said flexible member extends from said spring spool at said one first position;
g. t=the thickness of one wrap of said belt webbing; and
h. f=a factor for friction.

8. A vehicle occupant safety apparatus comprising:
a belt webbing spool supported for rotation about a belt webbing spool axis in a belt retraction direction and an opposite belt withdrawal direction;
a length of belt webbing wound on said belt webbing spool, said belt webbing being extensible about a vehicle occupant to restrain the occupant;
a shaft spool fixed for rotation with said belt webbing spool, said shaft spool having an outer peripheral surface;
a spring spool supported for rotation about a spring spool axis in first and second opposite directions, said spring spool axis being spaced apart from said belt webbing spool axis, said spring spool having an outer peripheral surface;

a rewind spring connected with said spring spool for biasing said spring spool for rotation in the first direction to apply belt retraction force to said spring spool; and an elongate flexible member extending between said outer peripheral surface of said spring spool and said outer peripheral surface of said shaft spool for transmitting belt retraction force from said spring spool to said shaft spool to bias said belt webbing spool for rotation in the belt retraction direction;

said outer peripheral surface of one of said spools having a radially undulating configuration with a radius which both increases and decreases a plurality of times over the axial length of said one spool.

9. A vehicle occupant safety apparatus as set forth in claim 8 wherein said rewind spring is enclosed within a first portion of said spring spool.

10. A vehicle occupant safety apparatus as set forth in claim 8 wherein said outer peripheral surface of said spring spool includes surfaces defining a helical groove on said spring spool, said outer peripheral surface of said shaft spool including surfaces defining a helical groove on said shaft spool, said flexible member being wrapped in said grooves on said spring spool and said shaft spool, said flexible member being unwindable from said spring spool and windable upon said shaft spool upon withdrawal of belt webbing from said belt webbing spool, said flexible member being unwindable from said shaft spool and windable upon said spring spool upon retraction of belt webbing onto said belt webbing spool.

11. A vehicle occupant safety apparatus as set forth in claim 8 wherein the radius of said outer peripheral surface of said spring spool has different predetermined values as measured at selected points spaced apart axially along said outer peripheral surface of said spring spool, and the radius of said outer peripheral surface of said shaft spool has different predetermined values as measured at selected points spaced apart axially along said outer peripheral surface of said shaft spool, whereby the retraction force exerted by said rewind spring on said belt webbing varies in a predetermined manner as said flexible member is wound and unwound between said spring spool and said shaft spool;

the values of the radii of said outer peripheral surfaces of said spring spool and said shaft spool being selected so that the retraction force applied to said belt webbing has a first level when said belt webbing is completely retracted on said belt webbing spool;

the values of the radii of said outer peripheral surfaces of said spring spool and said shaft spool being selected so that the level of the retraction force applied to said belt webbing diminishes from the first level to a second level, upon withdrawal of belt webbing from said belt webbing spool; and the values of the radii of said outer peripheral surfaces of said spring spool and said shaft spool being selected so that the level of the retraction force applied to said belt webbing increases from the second level to a third level as said belt webbing is fully withdrawn from said belt webbing spool.

* * * * *